(12) United States Patent
Park

(10) Patent No.: US 9,979,870 B2
(45) Date of Patent: May 22, 2018

(54) CAMERA MODULE HAVING LIGHT-OUTPUTTING UNIT

(71) Applicant: LG INNOTEK CO., LTD., Seoul (KR)

(72) Inventor: Seung Ryong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days. days.

(21) Appl. No.: 15/114,546

(22) PCT Filed: Jan. 26, 2015

(86) PCT No.: PCT/KR2015/000791
§ 371 (c)(1),
(2) Date: Jul. 27, 2016

(87) PCT Pub. No.: WO2015/115763
PCT Pub. Date: Aug. 6, 2015

(65) Prior Publication Data
US 2016/0344913 A1    Nov. 24, 2016

(30) Foreign Application Priority Data

Jan. 28, 2014 (KR) .................. 10-2014-0010588

(51) Int. Cl.
*H04N 5/225* (2006.01)
*G03B 15/05* (2006.01)
(Continued)

(52) U.S. Cl.
CPC ............. *H04N 5/2257* (2013.01); *B60R 1/00* (2013.01); *G03B 15/05* (2013.01); *G03B 17/02* (2013.01);
(Continued)

(58) Field of Classification Search
CPC .. H04N 5/2257; H04N 5/2256; H04N 5/2252; H04N 5/2253; G03B 17/12;
(Continued)

(56) References Cited

U.S. PATENT DOCUMENTS

| 6,832,725 B2 | 12/2004 | Gardiner et al. |
| 6,850,631 B1 | 2/2005 | Oda et al. |
| 2010/0172552 A1* | 7/2010 | Wu ............... G06K 9/00013 382/124 |
| 2010/0253826 A1* | 10/2010 | Green ............... G01S 17/875 348/335 |

(Continued)

FOREIGN PATENT DOCUMENTS

| EP | 0840107 A2 | 5/1998 |
| EP | 1830565 A2 | 9/2007 |

(Continued)

*Primary Examiner* — Gevell Selby
(74) *Attorney, Agent, or Firm* — Birch, Stewart, Kolasch & Birch, LLP

(57) ABSTRACT

A camera module according to an embodiment of the present invention comprises: a housing which comprises a supporting part and in which the inside space therein is divided by the supporting part into a first space and a second space; an image sensor housed in the first space; a lens unit arranged on the image sensor; a light-outputting unit arranged between the lens unit and the housing; and a light source unit arranged in the second space so as to correspond to the light-outputting unit, wherein the light-outputting unit outputs light incident from the light source unit to the outside.

13 Claims, 4 Drawing Sheets

(51) Int. Cl.
*G03B 17/02* (2006.01)
*B60R 1/00* (2006.01)
*G03B 17/12* (2006.01)

(52) U.S. Cl.
CPC ........... *G03B 17/12* (2013.01); *H04N 5/2252* (2013.01); *H04N 5/2253* (2013.01); *H04N 5/2256* (2013.01); *B60R 2300/103* (2013.01); *G03B 2215/0503* (2013.01); *G03B 2215/0592* (2013.01)

(58) Field of Classification Search
CPC  G03B 17/02; G03B 15/05; G03B 2215/0592; G03B 2215/0503; B60R 1/00; B60R 2300/103
See application file for complete search history.

(56) References Cited

U.S. PATENT DOCUMENTS

2011/0254763 A1* 10/2011 Lee .................... G06F 3/042
  345/157
2016/0366316 A1* 12/2016 Chen ................... H04N 5/2256

FOREIGN PATENT DOCUMENTS

| JP | 8-334811 A | 12/1996 |
| KR | 10-0510576 B1 | 8/2005 |
| KR | 10-2005-0108265 A | 11/2005 |
| KR | 10-2006-0028141 A | 3/2006 |
| KR | 10-2010-0001488 A | 1/2010 |

* cited by examiner

CAMERA MODULE HAVING LIGHT-OUTPUTTING UNIT

CROSS REFERENCE TO RELATED APPLICATIONS

This application is the National Phase of PCT/KR2015/000791 filed on Jan. 26, 2015, which claims priority under 35 U.S.C. § 119(a) to Korean Patent Application No. 10-2014-0010588 filed on Jan. 28, 2014, all of which are hereby expressly incorporated by reference into the present application.

TECHNICAL FIELD

The present disclosure relates to a camera module.

BACKGROUND ART

Recently, a demand for a vehicular camera installed in a vehicle for safe driving of the vehicle is increasing. For example, when parking, a parking assistance camera that detects an object or a person located in front of or behind a vehicle and draws attention of a driver may be used.

In terms of its use, a vehicular camera also needs to operate in a low-light environment. Accordingly, auxiliary lighting for assisting in an operation of the vehicular camera may be installed with the vehicular camera.

Meanwhile, there is a problem in that an additional space for installing auxiliary lighting is required in addition to an installation space of a vehicular camera for the auxiliary lighting to be installed in a vehicle for an operation of the vehicular camera.

DISCLOSURE

Technical Problem

The present disclosure is directed to providing a camera module which does not require a separate space for installing auxiliary lighting.

Technical Solution

According to an embodiment of the present disclosure, a camera module includes a housing including a supporting part and in which an inner space is divided by the supporting part into a first space and a second space, an image sensor housed in the first space, a lens unit arranged on the image sensor, a light-outputting unit arranged between the lens unit and the housing, and a light source unit arranged in the second space to correspond to the light-outputting unit, wherein the light-outputting unit outputs light incident from the light source unit to the outside.

The supporting part may be arranged in the housing to support the lens unit.

The supporting part may include a through-hole into which the lens unit is inserted formed at a central portion thereof.

The light source unit may be arranged on the supporting part and include at least one light source.

Light output through a light output surface of the light-outputting unit may have a central propagation direction of 45° to 50° with respect to an optic axis (OA) of the camera module and may have an emission angle of 95° or less.

The light output surface may be an inclined surface with a height that increases as the surface nears the lens unit.

A degree of inclination of the light output surface may satisfy 5° to 10° with respect to the OA.

The light output surface may include a fine pattern.

The fine pattern may have a degree of inclination of 5° to 10° with respect to a surface perpendicular to the OA.

The fine pattern may include a prism pattern.

A slope of the prism pattern may satisfy 38° to 42° with respect to the surface perpendicular to the OA.

According to an embodiment of the present disclosure, a camera module includes a housing including a supporting part and in which an inner space is divided by the supporting part into a first space and a second space, an image sensor housed in the first space, a lens unit having one end supported by the supporting part and arranged in the second space to face the image sensor, and a lighting unit housed in the second space.

The lighting unit may include a light source unit including at least one light emitting element, and a light-outputting unit that guides light output from the light emitting element to an outside of the housing.

The at least one light emitting element may be arranged on the supporting part, and the light-outputting unit may be arranged between the lens unit and the housing.

The lens unit may include at least one lens arranged along an OA and a lens holder that houses and fixes the at least one lens, and the lens holder may be supported by the supporting part.

Advantageous Effects

According to an embodiment of the present disclosure, a camera module and auxiliary lighting are integrated with each other such that a separate space for installing the auxiliary lighting is not required.

MODES OF THE INVENTION

Figure 1:
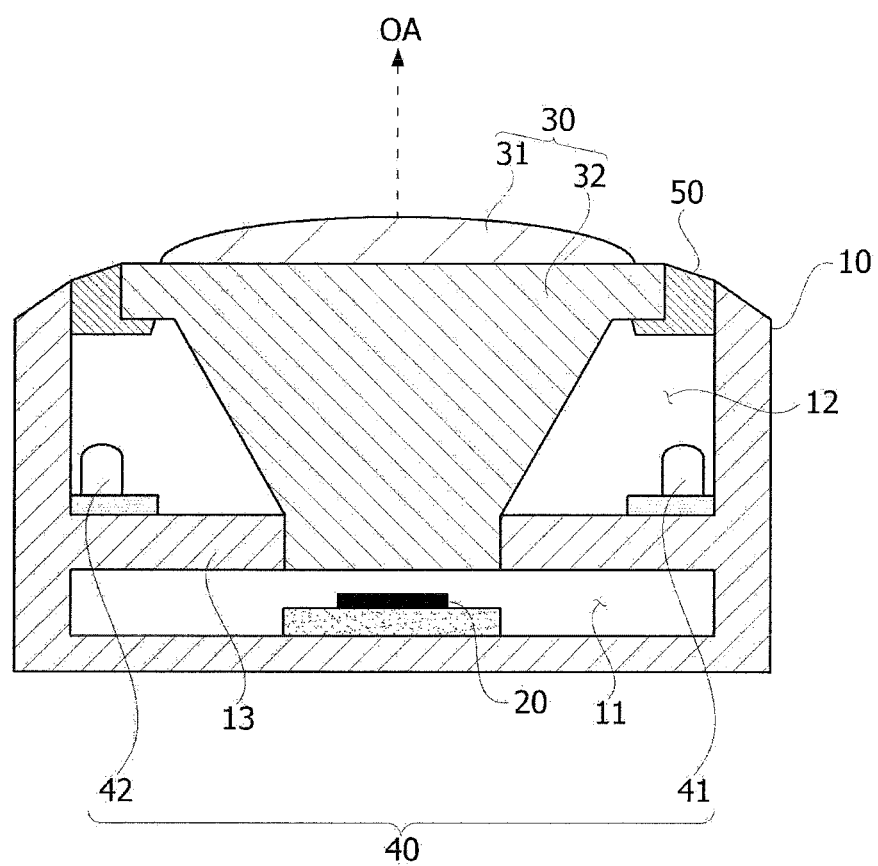
FIG. 1 is a lateral cross-sectional view schematically illustrating a camera module according to an embodiment of the present disclosure.

Since various modifications may be made to the present disclosure and the present disclosure may have various embodiments, particular embodiments will be illustrated in the drawings and described. However, this does not limit the present disclosure to the particular embodiments, and all modifications, equivalents, and substitutes included in the spirit and scope of the present disclosure should be construed as belonging to the present disclosure.

Terms including ordinals such as first and second may be used to describe various elements, but the elements are not limited by the terms. The terms are only used for the purpose of distinguishing one element from another element. For example, a second element may be referred to as a first element while not departing from the scope of the present disclosure, and likewise, a first element may also be referred to as a second element. The term and/or includes a combination of a plurality of related described items or any one item among the plurality of related described items.

In addition, the suffixes "module" and "part" of elements used in the description below are assigned or used only in consideration of the ease of writing the specification and do not have meanings or roles distinguished from each other.

When it is mentioned that a certain element is "connected" or "linked" to another element, although the certain element may be directly connected or linked to the other element, it should be understood that another element may exist therebetween. On the other hand, when it is mentioned that a certain element is "directly connected" or "directly linked" to another element, it should be understood that other elements do not exist therebetween.

Terms used in the application are merely used to describe particular embodiments and are not intended to limit the present disclosure. A singular expression includes a plural expression unless the context clearly indicates otherwise. In the application, terms such as "include" or "have" are should be understood as designating that features, number, steps, operations, elements, parts, or combinations thereof exist and not as precluding the existence of or the possibility of adding one or more other features, numbers, steps, operations, elements, parts, or combinations thereof in advance.

Unless otherwise defined, all terms including technical or scientific terms used herein have the same meaning as commonly understood by one of ordinary skill in the art to which the disclosure pertains. Terms, such as those defined in commonly used dictionaries, should be construed as having a meaning that is consistent with their meaning in the context of the relevant art and are not to be construed in an idealized or overly formal sense unless expressly so defined herein.

Hereinafter, an embodiment will be described in detail with reference to the accompanying drawings while like reference numerals will be given to the same or corresponding elements regardless of signs in the drawings and overlapping descriptions thereof will be omitted.

Figure 2:
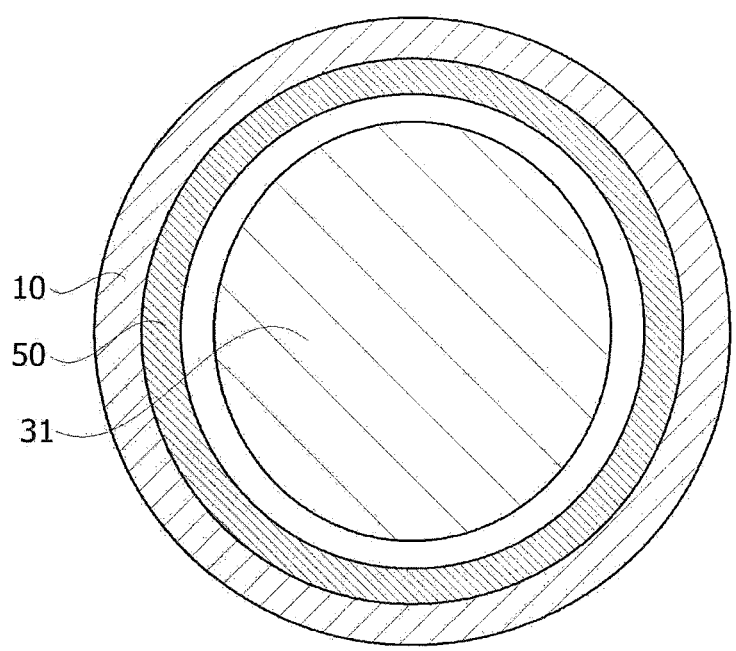
FIG. 2 is a view illustrating an upper surface of the camera module according to an embodiment of the present disclosure.
Figure 3:
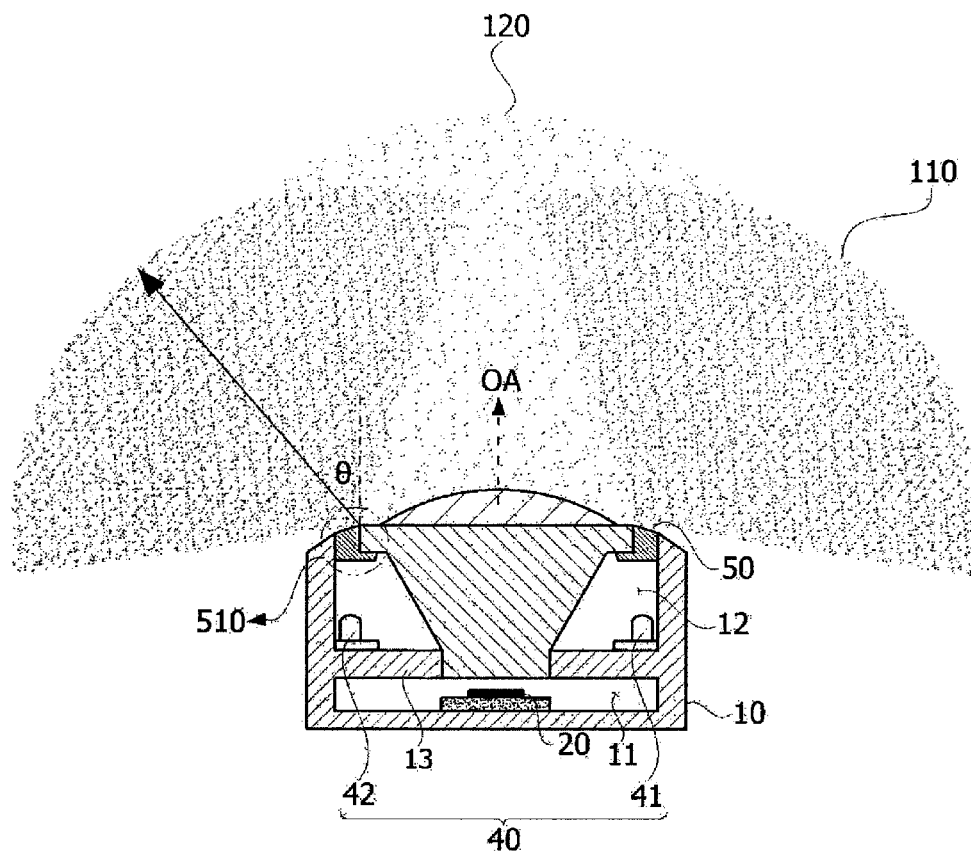
FIG. 3 is a view for describing an optical feature of the camera module according to an embodiment of the present disclosure.
Figure 4:
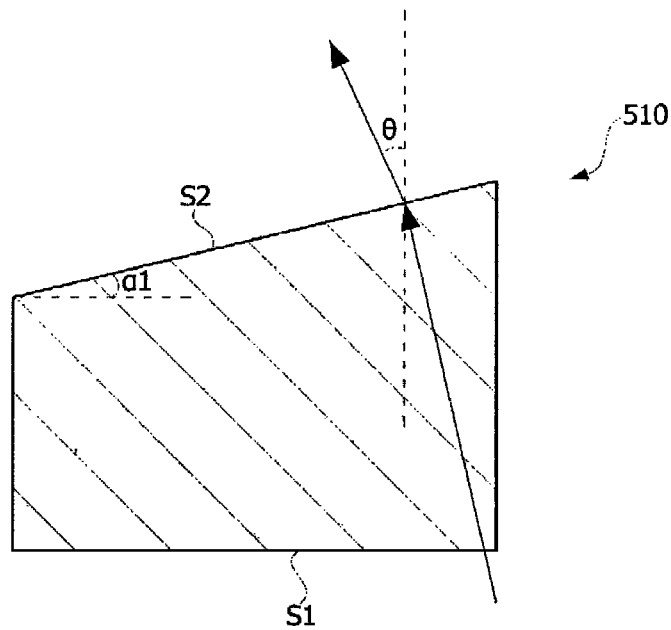
FIGS. 4 and 5 are views illustrating examples of a light output surface of a light-outputting unit of the camera module according to an embodiment of the present disclosure.
Figure 5:
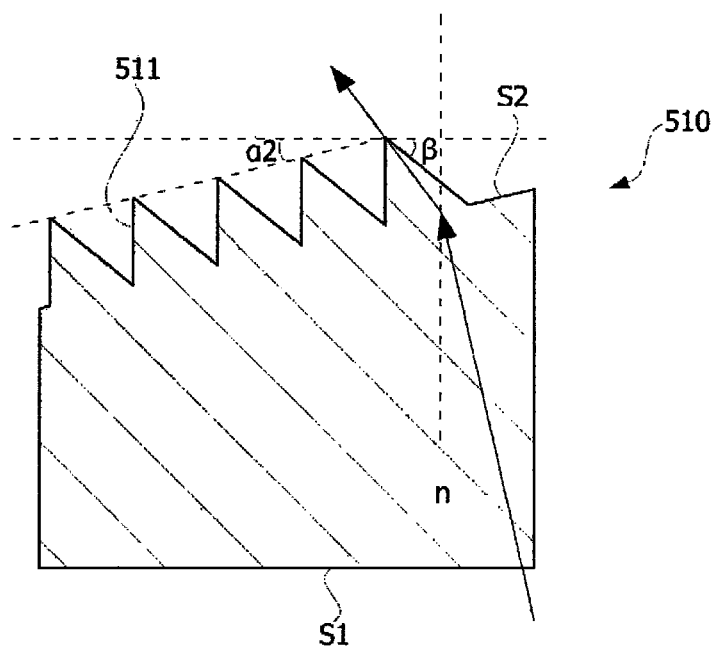

FIG. 1 is a lateral cross-sectional view schematically illustrating a camera module according to an embodiment of the present disclosure, and FIG. 2 is a view illustrating an upper surface of the camera module according to an embodiment of the present disclosure. FIG. 3 is a view for describing an optical feature of the camera module according to an embodiment of the present disclosure. FIGS. 4 and 5 are views illustrating examples of a light output surface through which light is output in the camera module according to an embodiment of the present disclosure.

Referring to FIG. 1, according to an embodiment of the present disclosure, a camera module may include a housing 10, an image sensor unit 20, a lens unit 30, a light source unit 40, a light-outputting unit 50, etc. Since the elements illustrated in FIG. 1 are not essential, a camera module according to an embodiment of the present disclosure may also be provided to include more or less elements than those above.

The housing 10 has an open upper portion.

The housing 10 houses the image sensor unit 20, the lens unit 30, the light source unit 30, and the light-outputting unit 50. The housing 10 may include a supporting part 13, and an inner space of the housing 10 may be divided by the supporting part 130 into a first space 11 and a second space 12.

The first space 11 may be formed at a lower portion of the housing 10, and the image sensor unit 20 may be housed in the first space 11. That is, the image sensor unit 120 may be housed in the first space 11 formed by a bottom surface, a wall surface, and the supporting part 13 of the housing 10.

The second space 12 may be formed on the first space 11. The lens unit 30, the light source unit 40, and the light-outputting unit 50 may be housed in the second space 12. That is, the lens unit 30, the light source unit 40, and the light-outputting unit 50 may be housed in the second space 12 formed by the wall surface, the supporting part 13, and the open upper portion of the housing 10.

The supporting part 13 supports the lens unit 30.

For this, a through-hole that connects the first space 11 and the second space 12 to each other may be formed at a central portion of the supporting part 13. The lens unit 30 may pass through the through-hole of the supporting part 13 and be coupled thereto.

The image sensor unit 20 may be arranged at a lower surface of the first space 11 of the housing 10.

The image sensor unit 20 serves to receive light corresponding to image information of an object through the lens unit 30 and convert the received light into an electrical signal. For this, the image sensor unit 20 includes at least one image sensor. Although not limited thereto, the image sensor may include a metal-oxide semiconductor (MOS), a charge coupled device (CCD), etc.

The lens unit 30 may be arranged on the image sensor unit 20.

The image sensor unit 20 is arranged so that a sensor surface that receives light faces the lens unit 30.

The lens unit 30 receives light corresponding to image information of an object and transmits the light to the sensor surface of the image sensor unit 20. The lens unit 30 may include at least one lens 31 sequentially arranged along an optic axis (OA) and a lens holder 32 that houses and fixes the at least one lens 31.

The lens unit 30 may be housed in the second space 12 of the housing 10 and may pass through the supporting part 13 and be coupled thereto. That is, the lens holder 32 of the lens unit 30 may be inserted into the through-hole formed at the central portion of the supporting part 13. Accordingly, the lens unit 30 may face the sensor surface of the image sensor unit 20 housed in the first space 11.

The light source unit 40 may be arranged at an outside of the lens unit 30. The light source unit 40 may be arranged on the supporting part 13 and may be arranged near the through-hole to which the lens unit 30 is coupled. The light source unit 40 may be arranged so that a central propagation direction of light output from the light source unit 40 does not overlap the lens unit 30.

The light source unit 30 may include one or more light emitting elements 41 and 42. Although not limited thereto, the light emitting elements 41 and 42 may include a light emitting diode (LED), an organic light emitting diode (OLED), a laser diode (LD), a laser, etc.

The first space 11 housing the image sensor 20 and the second space 12 housing the light source unit 40 are divided into separate spaces by the supporting part 13. Accordingly, light output from the light source unit 40 is blocked from propagating toward the image sensor unit 20 in the first space 11, and interference in the image sensor unit 20 caused by the light output from the light source unit 40 may be prevented.

The light-outputting unit 50 may be arranged on the light source unit 40.

The light-outputting unit 50 serves to guide light output from the light source unit 40 to the outside. The light-outputting unit 50 is formed of a transparent material and may be formed with a plastic resin and the like. Although not limited thereto, at least one of polycarbonate (PC), polymethylmethacrylate (PMMA), polystyrene (PS), polyethyleneterephthalate (PET), polyethylenenaphthalate (PEN), polyethersulfone (PES), an allyl resin, or a selective combination thereof may be used as the plastic resin. In addition, the plastic resin may include a cyclic olefin copolymer (COC), a cyclic olefin polymer (COP), etc.

Referring to FIGS. 1 and 2, the light-outputting unit 50 may be arranged between an outer circumferential surface of the lens unit 30 and an inner circumferential surface of the housing 10.

The shape of the light-outputting unit 50 may vary according to the shape of the outer circumferential surface of the lens unit 30 and the shape of the inner circumferential surface of the housing 10. For example, the light-outputting unit 50 may be arranged in a ring shape so that an outer surface thereof comes into contact with the inner circumferential surface of the housing 10 and an inner surface thereof comes into contact with the outer circumferential surface of the lens unit 30.

The light-outputting unit 50 includes a light incident surface (refer to reference symbol S1 in FIG. 4) through which light is incident from the light source unit 40 and a light output surface (refer to reference symbol S2 in FIG. 4) through which the incident light is output.

The light incident surface of the light-outputting unit 50 is arranged to be spaced apart from the light source unit 40 by a predetermined interval.

As illustrated in FIG. 3, the light-outputting unit 50 is designed so that light output through the light output surface of the light-outputting unit 50 is prevented from being incident on the lens unit 30 again and causing interference. That is, to prevent light 110 output through the light output surface of the light-outputting unit 50 from being incident on the lens unit 30 again, a propagation direction and an emission width of light from the light output surface of the light-outputting unit 50 may be designed so as not to interfere with a camera module viewing angle 120.

Although not limited thereto, the viewing angle of the camera module may be designed to satisfy 190° (a half-power angle 95°) about the OA.

Although not limited thereto, the light output through the light output surface of the light-outputting unit 50 may have a central propagation direction θ satisfying 40° to 45° with respect to the OA of the lens unit 30 and may have an emission width satisfying 95° or less. Here, the central propagation direction θ of the light refers to a propagation direction of light with the greatest intensity of light propagating after passing through the light output surface. In this way, when the viewing angle of the camera module and the propagation direction and the emission width of light from the light-outputting unit 50 are adjusted, interference between the light-outputting unit 50 and the lens unit 30 may be prevented.

To adjust the propagation direction and the emission angle of light through the light output surface of the light-outputting unit 50, the light output surface of the light-outputting unit 50 may control a degree of inclination thereof or include a fine pattern.

FIGS. 4 and 5 are enlarged views of a portion 510 of the light-outputting unit 50 in the camera module of FIG. 1 and are views for describing examples of the light output surface.

For example, as in FIG. 4, the light output surface S2 of the light-outputting unit 50 may be an inclined surface with a height that gradually increases as it nears the lens unit 30.

A degree of inclination α1 of the light output surface S2 may vary according to a medium of the light-outputting unit 50. For example, the degree of inclination α1 of the light output surface S2 satisfies 5° to 10° with respect to an end surface perpendicular to an incident surface S1 or the OA. In this way, when the degree of inclination α1 of the light output surface S2 is adjusted, the light output through the light output surface of the light-outputting unit 50 may be prevented from being incident on the lens unit 30 again and causing interference.

For example, as in FIG. 5, the light output surface S2 of the light-outputting unit 20 may include a fine pattern 511. Although not limited thereto, the fine pattern 511 may include a prism pattern.

In addition, the fine pattern 511 may be arranged to satisfy a degree of inclination α2 of 5° to 10° from a horizontal surface that is perpendicular to the OA. That is, the fine pattern 511 may be formed so that an angle formed between the horizontal surface, which is perpendicular to the OA, and a straight line connecting vertices of each prism pattern forming the fine pattern 511 satisfies 5° to 10°.

A slope β of each of the prism patterns forming the fine pattern 511 may satisfy 35° to 45° with respect to the horizontal surface that is perpendicular to the OA of the camera module.

Meanwhile, the slope β of each of the prism patterns forming the fine pattern 511 may vary according to a medium of the light-outputting unit 50. For example, when a refractive index n of a medium forming the light-outputting unit 50 is 1.5, the slope β of the prism pattern may satisfy 40° to 42° with respect to the horizontal surface that is perpendicular to the OA. In addition, for example, when the refractive index n of the medium forming the light-outputting unit 50 is 1.6, the slope β of the prism pattern may satisfy 38° to 39° with respect to the horizontal surface that is perpendicular to the OA.

In this way, when the fine pattern 511 of the light output surface S2 is adjusted, the light output through the light output surface of the light-outputting unit 50 may be prevented from being incident on the lens unit 30 again and causing interference.

In this specification, the light source 40 and the light-outputting unit 50 may also be collectively referred to as a lighting unit. Although not illustrated, the light source 40 may also be integrally formed with the light-outputting unit 50 and arranged between the lens unit 30 and the housing 10.

According to the embodiment of the present disclosure described above, a light source is integrally coupled to a camera module such that a separate space for installing auxiliary lighting is not required and thus an installation space of a camera system is minimized.

In addition, a light source that serves as lighting is arranged in a separate space from an image sensor such that light output from the light source may be prevented from causing interference with the image sensor.

Although the present disclosure has been described with reference to the exemplary embodiment of the present disclosure, those of ordinary skill in the art should understand that the present disclosure may be modified and changed in various ways within a scope that does not depart from the spirit and area of the present disclosure described in the claims below.

The invention claimed is:
1. A camera module comprising:
  a housing including a supporting part and in which an inner space is divided by the supporting part into a first space and a second space;

an image sensor housed in the first space;
a lens unit arranged on the image sensor;
a light-outputting unit arranged between the lens unit and the housing; and
a light source unit arranged in the second space to correspond to the light-outputting unit,
wherein the light-outputting unit outputs light incident from the light source unit to the outside, and
wherein light output through a light output surface of the light-outputting unit has a central propagation direction of 45° to 50° with respect to an optic axis (OA) of the camera module and has an emission angle of 95° or less.

2. The camera module of claim 1, wherein the supporting part is arranged in the housing to support the lens unit.

3. The camera module of claim 2, wherein the supporting part includes a through-hole into which the lens unit is inserted formed at a central portion thereof.

4. The camera module of claim 2, wherein the light source unit is arranged on the supporting part and includes at least one light source.

5. The camera module of claim 1, wherein the light output surface is an inclined surface with a height that increases as the surface nears the lens unit.

6. The camera module of claim 5, wherein a degree of inclination of the light output surface satisfies 5° to 10° with respect to the OA.

7. The camera module of claim 1, wherein the light output surface includes a fine pattern.

8. The camera module of claim 7, wherein the fine pattern has a degree of inclination of 5° to 10° with respect to a surface perpendicular to the OA.

9. The camera module of claim 7, wherein the fine pattern includes a prism pattern.

10. The camera module of claim 9, wherein a slope of the prism pattern satisfies 38° to 42° with respect to the surface perpendicular to the OA.

11. A camera module comprising:
a housing including a supporting part and in which an inner space is divided by the supporting part into a first space and a second space;
an image sensor housed in the first space;
a lens unit having one end supported by the supporting part and arranged in the second space to face the image sensor; and
a lighting unit housed in the second space,
wherein the lighting unit includes a light source unit including at least one light emitting element, and a light-outputting unit configured to guide light output from the light emitting element to an outside of the housing, and
wherein light output through a light output surface of the light-outputting unit has a central propagation direction of 45° to 50° with respect to an optic axis (OA) of the camera module and has an emission angle of 95° or less.

12. The camera module of claim 11, wherein the at least one light emitting element is arranged on the supporting part, and the light-outputting unit is arranged between the lens unit and the housing.

13. The camera module of claim 11, wherein:
the lens unit includes at least one lens arranged along an optic axis (OA) and a lens holder configured to house and fix the at least one lens; and
the lens holder is supported by the supporting part.

* * * * *